(12) United States Patent
Goh et al.

(10) Patent No.: US 7,995,806 B2
(45) Date of Patent: Aug. 9, 2011

(54) DIGITAL IMAGE PROCESSING APPARATUS, METHOD OF CONTROLLING THE SAME, AND RECORDING MEDIUM FOR STORING PROGRAM FOR EXECUTING THE METHOD

(75) Inventors: Ji-hyun Goh, Seongnam-si (KR); Sung-cheol Bae, Seongnam-si (KR); Sung-ha Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 862 days.

(21) Appl. No.: 12/011,850

(22) Filed: Jan. 30, 2008

(65) Prior Publication Data

US 2009/0016576 A1    Jan. 15, 2009

(30) Foreign Application Priority Data

Jul. 12, 2007    (KR) .................. 10-2007-0070071

(51) Int. Cl.
*G06K 9/00*    (2006.01)

(52) U.S. Cl. ........ 382/118; 382/117; 382/209; 382/274; 382/199; 382/260; 382/263; 382/103; 340/5.53; 340/5.83; 340/576; 340/825; 340/34

(58) Field of Classification Search .................. 382/118, 382/117, 209, 274, 199, 260, 263, 103; 340/5.53, 340/5.83, 576, 825, 34
See application file for complete search history.

(56) References Cited

U.S. PATENT DOCUMENTS

2007/0174272 A1 *    7/2007    Carter et al. ...................... 707/5
2008/0310688 A1 *    12/2008    Goldberg ...................... 382/118

FOREIGN PATENT DOCUMENTS

| JP | 2004-258764 A | 9/2004 |
| WO | WO 2006/091869 A3 | 8/2006 |

* cited by examiner

Primary Examiner — Matt Bella
Assistant Examiner — Mike Rahmjoo
(74) Attorney, Agent, or Firm — Drinker Biddle & Reath LLP

(57) ABSTRACT

A digital image processing apparatus for easily obtaining information regarding a face, a method of controlling the same, and a recording medium for storing a program for executing the method. The digital image processing apparatus includes a face recognition unit recognizing a face from an image, a face index assignment unit assigning a face index to the recognized face if the face recognized from the image is not a previously recognized face, and a relation index update unit that, if the image includes a second face, updates a relation index corresponding to the number of times the first face and second face appear together in a plurality of images.

18 Claims, 9 Drawing Sheets

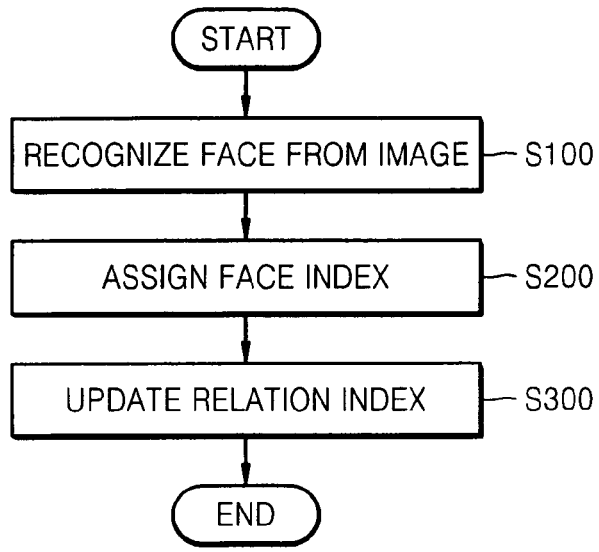
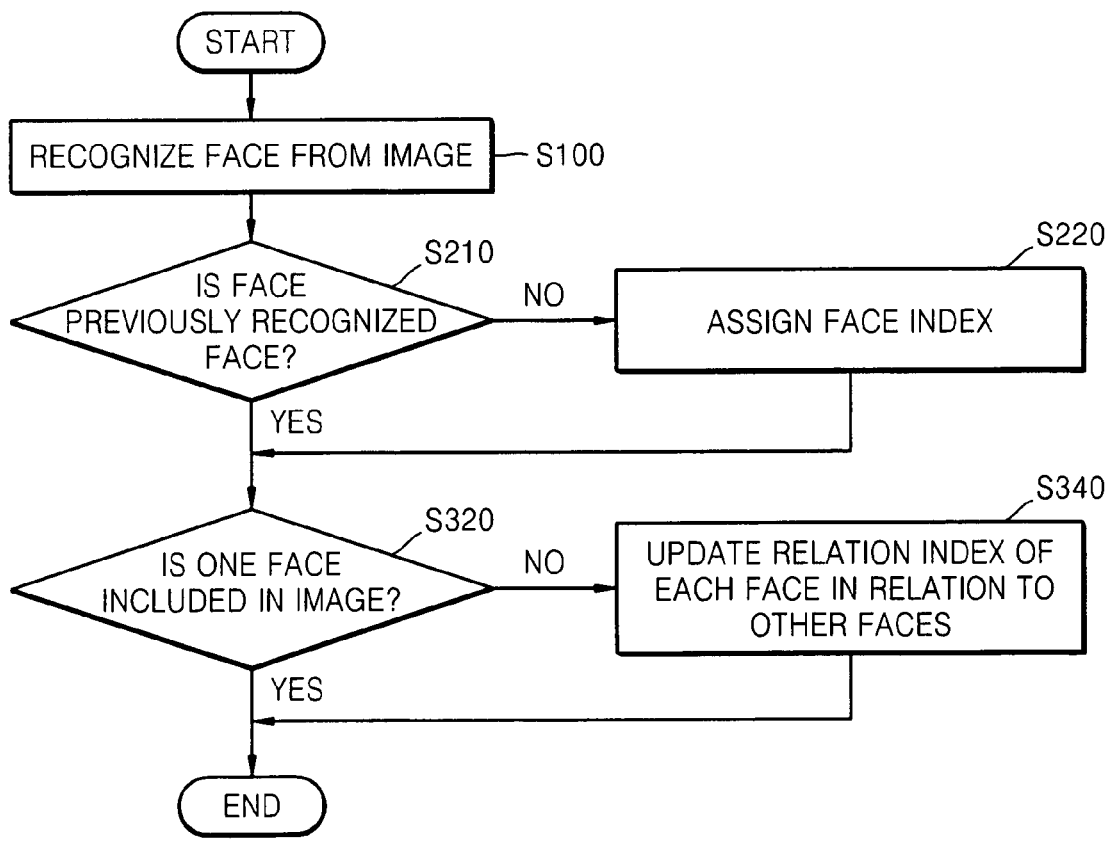

DIGITAL IMAGE PROCESSING APPARATUS, METHOD OF CONTROLLING THE SAME, AND RECORDING MEDIUM FOR STORING PROGRAM FOR EXECUTING THE METHOD

CROSS-REFERENCE TO RELATED PATENT APPLICATION

This application claims the benefit of Korean Patent Application No. 10-2007-0070071, filed on Jul. 12, 2007, in the Korean Intellectual Property Office, the disclosure of which is incorporated herein in its entirety by reference.

BACKGROUND OF THE INVENTION

1. Field of the Invention

The present invention relates to a digital image processing apparatus, a method of controlling the same, and a recording medium for storing a program for executing the method, and more particularly, to a digital image processing apparatus for easily capturing information regarding a relevant face, a method of controlling the same, and a recording medium for storing a program for executing the method.

2. Description of the Related Art

A digital capturing device, which is an example of a digital image processing apparatus, stores an image obtained by performing a capturing operation in a capturing mode, storing the image in a storage medium, and displays an image stored in the storage medium on a display unit in a playback mode. An image obtained by performing a capturing operation can also be reproduced in a capturing mode. In addition to a digital capturing device, a Personal Computer (PC) and a Personal Digital Assistant (PDA) are also examples of digital image processing apparatuses that can display an image stored in a storage medium on a display unit.

An image, which is being stored or has been stored in a storage medium of a digital image processing apparatus, often includes the faces of one or more people. When using a conventional digital image processing apparatus, a user cannot easily determine information such as whether an image of a specific person is stored in the storage medium of the apparatus, the number of times the person has been photographed alone or with other people and which images include the person alone or with other people. For example, a user may have to cycle through each image stored in a conventional digital camera to determine this information.

SUMMARY OF THE INVENTION

The present invention provides a digital image processing apparatus for easily capturing information regarding a relevant face, a method of controlling the same, and a recording medium for storing a program for executing the method. Various embodiments of the present invention allow a user to easily determine information such as whether an image of a specific person is stored in the storage medium of the apparatus, the number of times the person has been photographed and which images include the person alone or with other people.

According to an aspect of the present invention, there is provided a digital image processing apparatus comprising: a storage medium for storing images; a display unit for displaying images stored in the storage medium; a face recognition unit recognizing a face from an image including the face when the image is stored in the storage medium; a face index assignment unit assigning a face index to the recognized face if the face recognized from the image is not a previously recognized face; and a relation index update unit, if the image includes a plurality of faces, updating a relation index of a face regarding each of a plurality of other faces included in the image.

The face index may comprise personal information.

The relation index update unit may comprise: a relation index assignment unit assigning a relation index to a face included in the image if the face does not have any relation index in relation to other faces included in the image; and a relation index modifier modifying a relation index if a face included in the image has a relation index in relation to any other face included in the image.

In an embodiment, the relation index assignment unit assigns a relation index having a value of 1, and the relation index modifier increases the value of the relation index by 1.

According to another aspect of the present invention, there is provided a method of controlling a digital image processing apparatus displaying an image stored in a storage medium on a display unit, the method comprising: (a) recognizing a face from an image including the face; (b) if the recognized face is not a previously recognized face, assigning a face index to the recognized face; and (c) if a plurality of faces are included in the image, updating a relation index of a face regarding each of a plurality of other faces included in the image.

The face index may comprise personal information.

The method may further comprise (d) if a face is selected by a user from among faces included in images stored in the storage medium, displaying images comprising the selected face from among the images stored in the storage medium on the display unit.

Step (c) may comprise: (c1) if a plurality of faces are included in the image and a face does not have any relation index in relation to other faces, assigning a relation index to the face; and (c2) if a plurality of faces are included in the image and a face has a relation index in relation to any other face, modifying the relation index.

The modifying of the relation index may comprise increasing the relation index.

Step (c1) may comprise assigning a relation index having a value of 1, and (c2) may comprise increasing the value of the relation index by 1.

The method may further comprise (e) when an image is displayed on the display unit, displaying a face included in the image on the display unit with the number of images comprising the face from among the images stored in the storage medium.

The method may further comprise (f) if the image displayed on the display unit includes a plurality of faces, the plurality of faces included in the image are displayed on the display unit, and a face is selected by a user from among the plurality of faces displayed, displaying images including the selected face from among the images stored in the storage medium on the display unit.

The method may further comprise (g) when an image including a plurality of faces is displayed on the display unit, displaying a plurality of faces included in the image, and if a face is selected by the user from among the plurality of faces displayed, displaying other faces having a relation index associated with the selected face.

In an embodiment, when the other faces having a relation index associated with the selected face are displayed on the display unit, a grade of intimacy for each of the other faces, which is calculated using the formula below, may be displayed with the other faces.

The following formula may be used for calculating a grade of intimacy:

$(I_r/N) \times 100$, where $I_r$ is a relation index value of the selected face with respect to each of the other faces and N is the number of images including any face, which are stored in the storage medium.

The method may further comprise (h) classifying the images stored in the storage medium by calculating a grade of intimacy for each of the other faces using the formula:

$(I_r/N) \times 100$, where $I_r$ is a relation index value of a specific face among faces included in the images stored in the storage medium with respect to each of the other faces included in the images stored in the storage medium and N is the number of images comprising any face, which are stored in the storage medium.

The specific face may be a face included in the most images from among all faces included in the images stored in the storage medium.

The number of groups in which the images stored in the storage medium are classified and a range of a grade of intimacy corresponding to each group may be set by the user.

The specific face may be set by the user.

According to another aspect of the present invention, there is provided a computer readable recording medium storing a computer readable program for executing the method.

BRIEF DESCRIPTION OF THE DRAWINGS

The above and other features and advantages of the present invention will become more apparent by describing in detail exemplary embodiments thereof with reference to the attached drawings in which:

FIG. 6A is a flowchart illustrating a method of controlling a digital image processing apparatus, according to an embodiment of the present invention;

FIG. 6B is a flowchart illustrating a method of controlling a digital image processing apparatus, according to another embodiment of the present invention;

DETAILED DESCRIPTION OF THE INVENTION

The present invention will be described in detail by explaining embodiments of the invention with reference to the attached drawings.

Figure 1:
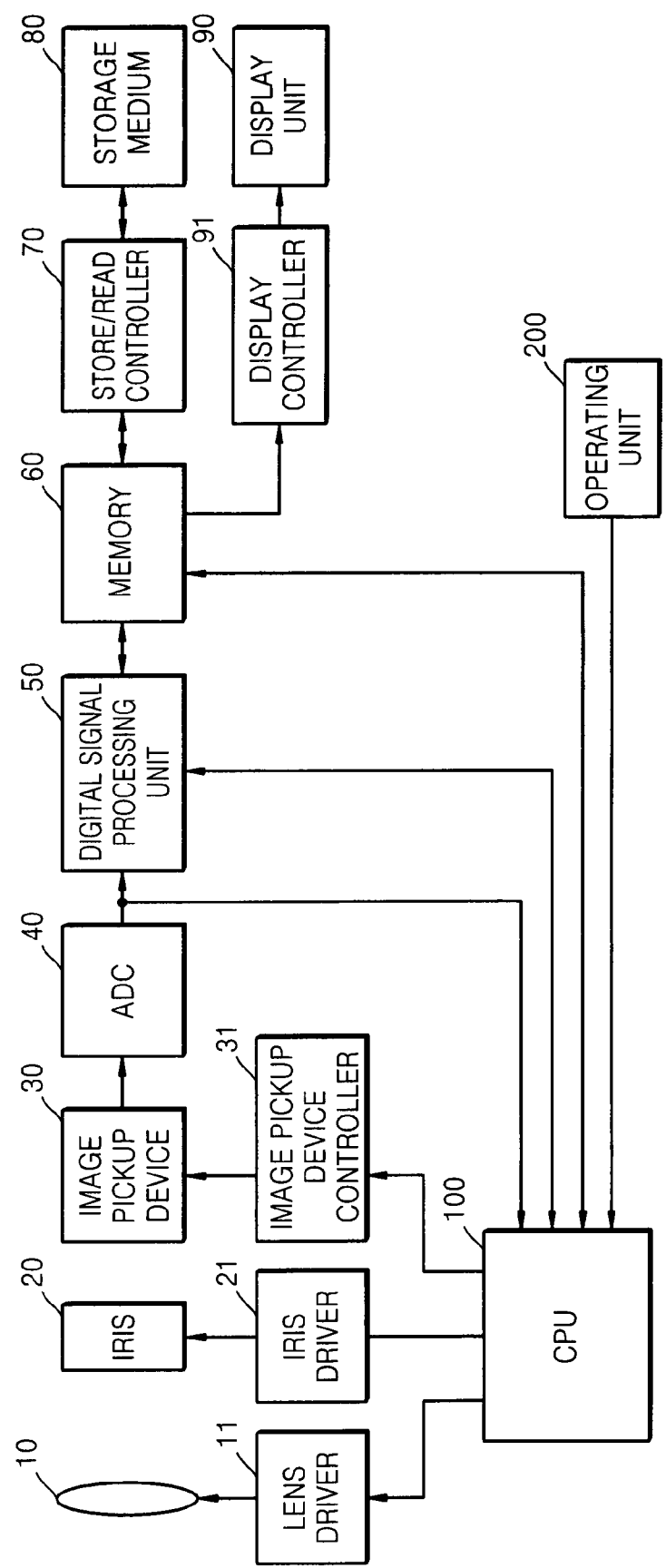
FIG. 1 is a block diagram of a digital image processing apparatus according to an embodiment of the present invention.

FIG. 1 is a block diagram of a digital image processing apparatus according to an embodiment of the present invention, and more particularly, a block diagram of a digital capturing apparatus as an example of the digital image processing apparatus according to an embodiment of the present invention.

Referring to FIG. 1, a general operation of the digital capturing apparatus is controlled by a Central Processing Unit (100). The digital capturing apparatus also includes an operating unit 200 including a key for generating an electrical signal by an operation of a user. The electrical signal generated by the operating unit 200 is transmitted to the CPU 100, allowing the CPU 100 to control the digital capturing apparatus according to the electrical signal.

In a capturing mode, when the electrical signal is transmitted to the CPU 100, the CPU 100 detects the electrical signal and controls a lens driver 11, an iris driver 21, and an image pickup device controller 31, thereby controlling a position of a lens 10 for autofocusing, an opening grade of an iris 20, and the sensitivity of an image pickup device 30. If a data signal of an image is output from the image pickup device 30, the data signal is converted to digital image data by an analog-to-digital converter (ADC) 40 and input to the CPU 100 and a digital signal processing unit 50. The digital signal processing unit 50 performs digital processing, such as gamma compensation, white balance adjustment, etc.

The image data output from the digital signal processing unit 50 is transmitted to a display controller 91 directly or via a memory 60. The memory 60 includes Read Only Memory (ROM) and Random Access Memory (RAM). The display controller 91 controls a display unit 90 to display an image on the display unit 90. The image data output from the digital signal processing unit 50 can be input to a store/read controller 70 via the memory 60, wherein the store/read controller 70 stores the image data in a storage medium 80 automatically or according to a signal from the user. The store/read controller 70 may display an image on the display unit 90 by reading image data from an image file stored in the storage medium 80 and transmitting the image data to the display controller 91 via the memory 60.

The digital capturing apparatus illustrated in FIG. 1 is an embodiment of the present invention, but the digital image processing apparatus according to the present invention is not limited to such a digital capturing apparatus. That is, the present invention can be applied to digital capturing apparatuses for capturing and reproducing images, Personal Digital Assistants (PDAs) for reproducing images stored in a storage medium, cellular phones, and Personal Computers (PCs). In addition, the digital capturing apparatuses are not limited to the configuration illustrated in FIG. 1. Although a digital capturing apparatus is mainly described for convenience of description in the current embodiment and the embodiments described below, the present invention is not limited to a digital capturing apparatus.

Figure 2:
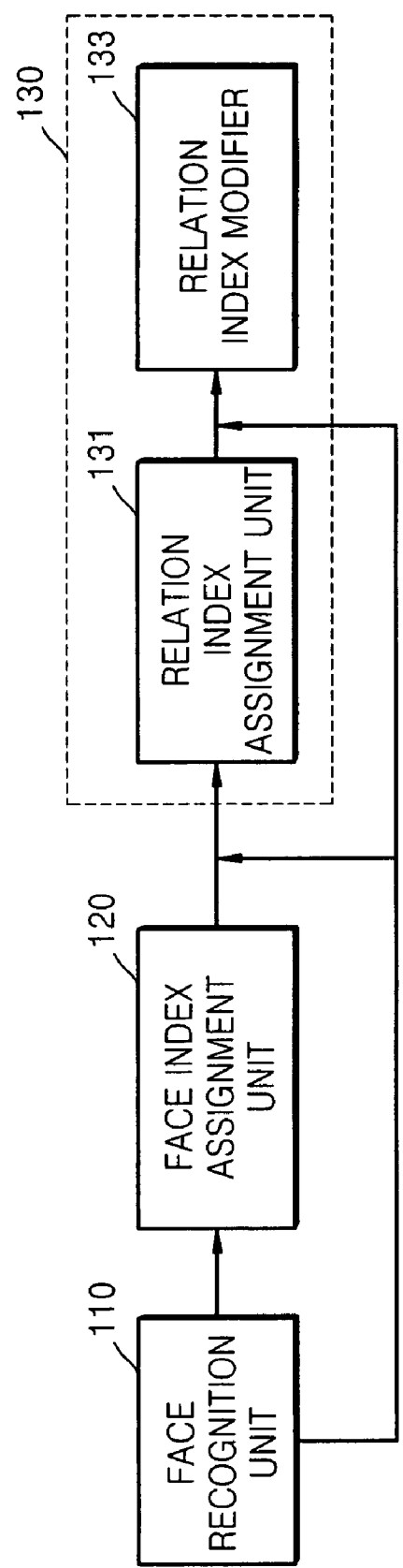
FIG. 2 is a block diagram of a portion of a digital image processing apparatus according to an embodiment of the present invention.

FIG. 2 is a block diagram of a portion of a digital image processing apparatus according to an embodiment of the present invention. The portion of a digital image processing apparatus illustrated in FIG. 2 can be a portion of the digital capturing apparatus illustrated in FIG. 1 or a portion of another digital image processing apparatus, such as a PDA, a cellular phone, or a PC. For example, the elements illustrated in FIG. 2 may be a portion of the CPU 100 illustrated in FIG. 1. However, it is obvious to one of ordinary skill in the art that the elements illustrated in FIG. 2 may be independent elements not included in a CPU, which are not illustrated in FIG. 1. Referring to FIG. 2, the digital image processing apparatus according to the current embodiment includes a face recognition unit 110, a face index assignment unit 120, and a relation index update unit 130.

The face recognition unit 110 recognizes a face from an image including the face. For example, if a portion of the digital image processing apparatus illustrated in FIG. 2 is a portion of the digital capturing apparatus illustrated in FIG. 1, the face recognition unit 110 recognizes a facial part in an image by analyzing image data output from the digital signal processing unit 50 of FIG. 1 using data for detecting a facial part, which is stored in the memory 60 of FIG. 1 and will be described later. It is obvious to one of ordinary skill in the art that various changes in form and details can be implemented such that the face recognition unit 110 can recognize a facial part in an image by analyzing image data output from the ADC 40 of FIG. 1 not from the digital signal processing unit 50 of FIG. 1. In this case, the face recognition unit 110 recognizes a face in an image and determines by extracting feature points from the recognized face whether the recognized face is a previously recognized face or a newly recognized face.

Various methods of recognizing a face can be used. For example, a facial part is recognized from an image, and it is determined by extracting feature points from the face whether the recognized face is a previously recognized face or a newly recognized face. The recognizing of the facial part and the extracting of the feature points can be simultaneously performed, and various changes can be implemented.

In order to recognize a facial part from an image, various methods can be used. For example, if data regarding a major color of a face has been previously determined or input, a facial part may be recognized by determining whether the data regarding a major color of a face is included in image data. In another embodiment, if data regarding an eye or a shape of the eye of a face has been previously determined or input, a facial part may be recognized by determining whether the data regarding an eye or a shape of the eye of a face is included in image data. In yet another embodiment, if data regarding a T shape formed by an eyebrow part (or an eye part) and a nose part have been previously determined or input, a facial part may be recognized by determining whether the data regarding a T shape is included in image data.

Determining whether a recognized face is a previously recognized face or a newly recognized face can be achieved by extracting and analyzing data regarding feature points, such as shapes of eyebrows, eyes, nose, mouth, and jaw. In detail, by detecting eyes and extracting a double eyelid, detecting a size of a nose, a shape of the ridge of the nose, and a position of the nostrils, extracting a shape of the mouth and jaw, and analyzing them, it is determined whether a recognized face is a previously recognized face or a newly recognized face. This face recognizing method is only an example, and the present invention is not limited thereto.

The face index assignment unit 120 assigns a face index to the recognized face if the recognized face is not a previously recognized face according to the recognition result of the face recognition unit 110 determining whether the recognized face is a previously recognized face or a newly recognized face. Referring to FIG. 2, if the recognized face is a previously recognized face, data may be directly transmitted from the face recognition unit 110 to the relation index update unit 130 without passing through the face index assignment unit 120. The face index can include personal information, such as a name, and thus, a user can select a specific face by inputting personal information, such as a name, into the digital image processing apparatus when using the digital image processing apparatus.

The relation index update unit 130 updates a relation index, wherein a relation index of a face in relation to another face means the number of images in which the face and the other face are captured together. That is, if the image includes a plurality of faces, the relation index update unit 130 updates a relation index regarding each of a plurality of other faces with respect to each face included in the image. If the image includes only one face, the relation index update unit 130 may not perform anything or may update a relation index regarding the face with respect to the face. The relation index update unit 130 can update a relation index when an image including a face is stored in a storage medium. The relation index update unit 130 also may update a relation index according to a signal from the user in a state in which images are stored in the storage medium.

In detail, referring to FIG. 2, the relation index update unit 130 can include a relation index assignment unit 131 and a relation index modifier 133.

The relation index assignment unit 131 assigns a relation index to a face included in an image if the face does not have any relation index in relation to the other faces. If only one face is included in an image, and if the face is not included in images stored in a storage medium, the relation index assignment unit 131 may assign a relation index for the face.

The relation index modifier 133 modifies a relation index if a face included in an image has the relation index in relation to any other face. Here, the relation index modifier 133 can modify the relation index by using various methods, for example, the relation index modifier 133 may increase the relation index by 1, decrease the relation index, or increase the relation index by a value other than 1. In the current embodiment and the embodiments described below, for convenience of description, the only case described is that in which the relation index modifier 133 increases a relation index by 1. In this case, the relation index assignment unit 131 may assign a relation index having the value of 1. If only one face is included in an image, and if a relation index in relation to the face itself is assigned to the face, the relation index modifier 133 may increase the relation index by 1.

For example, a case in which 15 images having at least one of three faces of A, B, and C as shown in Table 1 are stored in a storage medium will now be described.

TABLE 1

| | Classification | | | | | | | | | | | | | | |
|---|---|---|---|---|---|---|---|---|---|---|---|---|---|---|---|
| | Im1 | Im2 | Im3 | Im4 | Im5 | Im6 | Im7 | Im8 | Im9 | Im10 | Im11 | Im12 | Im13 | Im14 | Im15 |
| Face | AB | AB | AC | BC | BAC | CAB | AB | CBA | AB | AB | BCA | C | A | AB | AB |

In the foregoing example, a relation index corresponding to the number of times a face, either A, B or C, appears with one or more other faces may be determined. Accordingly, because the first image Im1 includes faces A and B, a relation index $I_{AB}$ of A on B and a relation index $I_{BA}$ of B on A are set to 1. Next, because the second image Im2 also includes faces A and B, the relation index $I_{AB}$ of A on B and the relation index $I_{BA}$ of B on A are updated to 2. Similarly, because the third image Im3 includes faces A and C, a relation index $I_{AC}$ of A on C and a relation index $I_{CA}$ of C on A are set to 1. Next, because the fourth image Im4 includes faces B and C, a relation index $I_{BC}$ of B on C and a relation index $I_{CB}$ of C on B are set to 1. Because the fifth image Im5 includes faces A, B, and C, the relation index $I_{AB}$ of A on B and the relation index $I_{BA}$ of B on A are updated to 3, the relation index $I_{AC}$ of A on C and the relation index $I_{CA}$ of C on A are updated to 2, and the relation index $I_{BC}$ of B on C and the relation index $I_{CB}$ of C on B are updated to 2. In this manner, if 15 images Im1 to Im15 are being stored or have been stored in a storage medium as shown in Table 1, A, B, and C have relation indexes shown in Table 2.

TABLE 2

|   | A | B | C |
|---|---|---|---|
| A |   | $I_{AB} = 11$ | $I_{AC} = 5$ |
| B | $I_{BA} = 11$ |   | $I_{BC} = 5$ |
| C | $I_{CA} = 5$ | $I_{CB} = 5$ |   |

Referring to Table 2, the relation index of A on B is the same as the relation index of B on A. That is, a relation index of a specific face on the other specific face is the same as a relation index of the other specific face on the specific face. Thus, various changes can be implemented; for example, only a relation index regarding the other specific face with respect to a specific face can be assigned and updated without assigning a relation index regarding the specific face with respect to the other specific face.

The digital image processing apparatus according to the current embodiment can provide an environment for processing relation data between faces according to various user demands in the future by recognizing a face included in an image and updating relation indexes between faces included in images stored in a storage medium.

Figure 3:
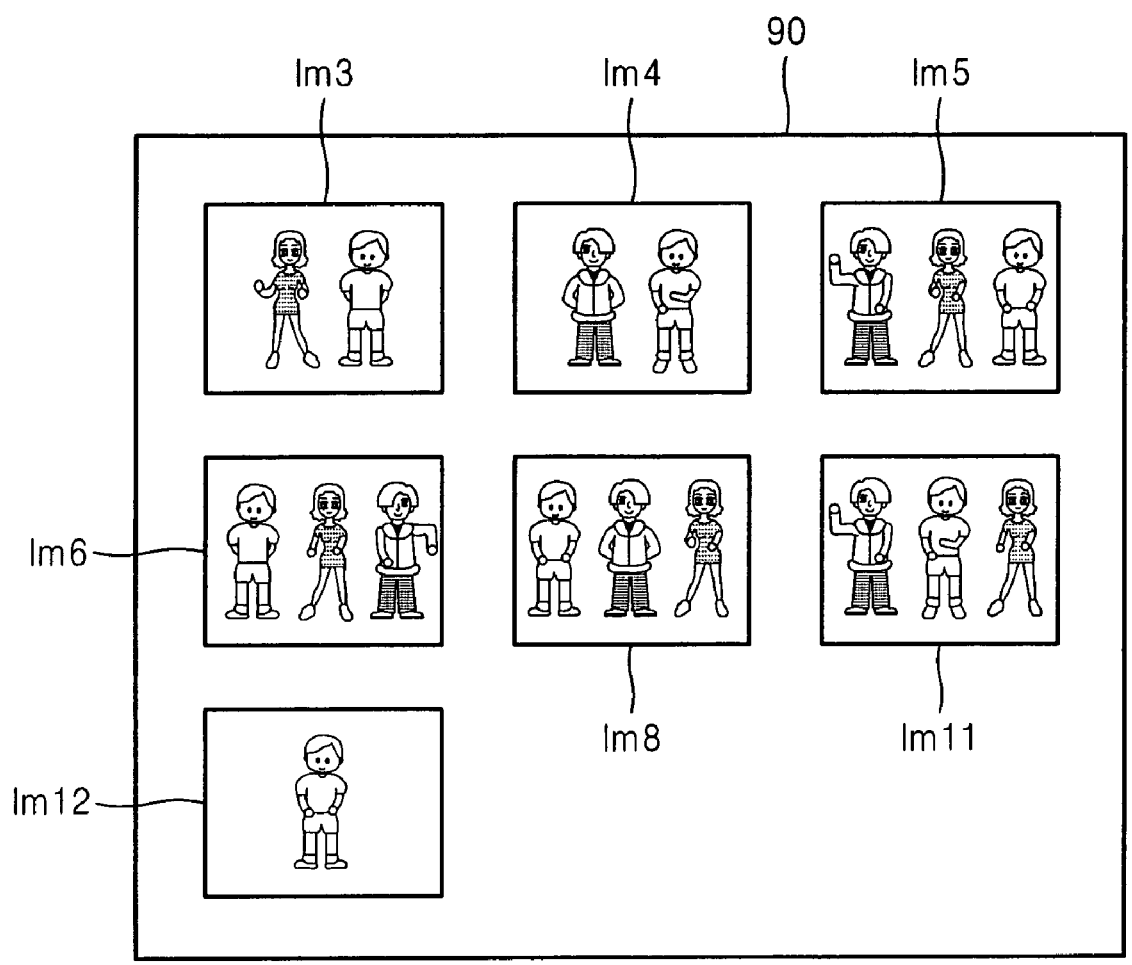
FIG. 3 is a conceptual diagram for describing an operation of a digital image processing apparatus according to another embodiment of the present invention.

FIG. 3 is a conceptual diagram for describing an operation of a digital image processing apparatus according to another embodiment of the present invention.

The digital image processing apparatus according to the current embodiment can include a face recognition unit, a face index assignment unit, and a relation index update unit, which are the same as those in the digital image processing apparatus illustrated in FIG. 2.

If a face is selected by a user from among a plurality of faces included in images stored in a storage medium, the digital image processing apparatus according to the current embodiment displays images including the selected face from among the images stored in the storage medium on a display unit. For example, if a face of C is selected by a user in a state in which 15 images having at least one of three faces of A, B, and C, as shown in Table 1, are stored in the storage medium, 7 images Im3, Im4, Im5, Im6, Im8, Im11, and Im12 including the selected C from among the 15 images stored in the storage medium are displayed on the display unit, as shown in FIG. 3. In FIG. 3, a woman wearing a skirt corresponds to A, a person having one eye shaded by hairs corresponds to B, and a person wearing short pants corresponds to C.

The user can select a face from among a plurality of faces included in images stored in a storage medium by using various methods. For example, since the digital image processing apparatus assigns a face index including personal information to a newly recognized face by including the face index assignment unit as described above, the user can select a specific face by inputting personal information, such as a name, into the digital image processing apparatus. As another example, when an image is displayed on the display unit, the user can select a face included in the image using a cursor. As another example, when the display unit has a touch function, the user can select a face by touching a facial part included in an image when the image is displayed on the display unit. That is, various changes can be implemented.

Sorting images including a selected face from among the images stored in the storage medium can be achieved using various methods. For example, since the digital image processing apparatus assigns a face index, which may include personal information, to a newly recognized face using the face index assignment unit as described above, images may be sorted using the face index or personal information associated with the face.

Accordingly, in one embodiment, a camera user may assign a name to each newly recognized face. In this embodiment, images may be sorted in alphabetical order by name so that, for example, images of a person named Ann are displayed first, followed by images of a person named Bob, followed by images of a person named Carl. In another embodiment, a digital image processing apparatus may assign a unique identifier to each newly recognized face and faces may be sorted according to the identifier. In yet another embodiment, a digital image processing apparatus may sort images using an identifier or other information provided by a user that may be associated with a face or metadata stored in an image file.

Images may also be classified into groups based on data corresponding to a face in an image as described in further detail below. In an embodiment, a user may view a group of images based on information provided by a user that may be associated with a face or metadata stored in an image file.

Figure 4:
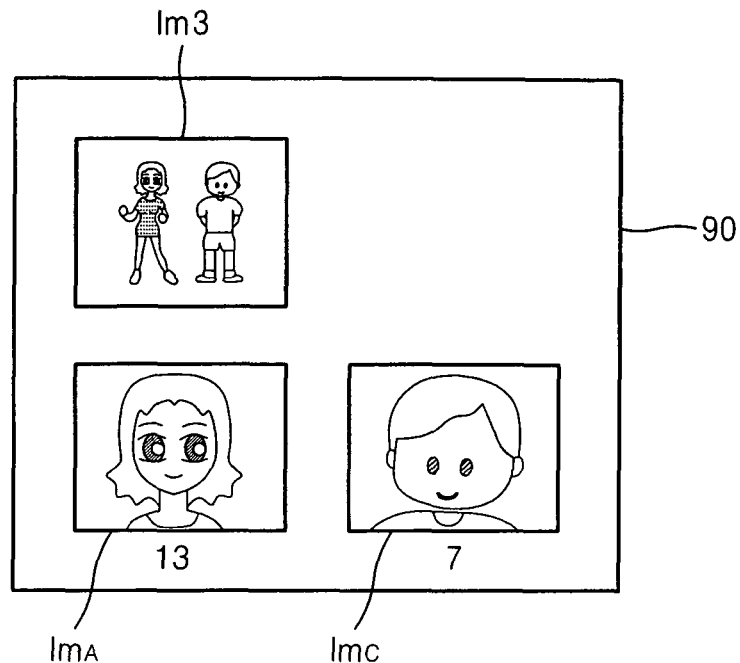
FIG. 4 is a conceptual diagram for describing an operation of a digital image processing apparatus according to another embodiment of the present invention.

FIG. 4 is a conceptual diagram for describing an operation of a digital image processing apparatus according to another embodiment of the present invention. The digital image processing apparatus according to the current embodiment can include a face recognition unit, a face index assignment unit, and a relation index update unit, which are the same as those in the digital image processing apparatus illustrated in FIG. 2.

When an image is displayed on a display unit, the digital image processing apparatus according to the current embodiment displays a face included in the image on the display unit. In this case, the digital image processing apparatus displays the face with the number of images including the face from among images stored in the storage medium. For example, in a state in which 15 images having at least one of three faces of A, B, and C, as shown in Table 1, are stored in the storage medium, when the image Im3 including the two faces of A and C is displayed on the display unit as shown in FIG. 4, the two faces $Im_A$ and $Im_C$ of A and C are displayed on the display unit. In this case, 13, which is the number of images including the face of A from among the images stored in the storage medium, and 7, which is the number of images including the face of C, are respectively displayed with the faces of A and C. Then, the user can easily and immediately obtain information on how many images among the images stored in the storage medium a face included in an image displayed on the display unit is included in.

In a state in which the plurality of faces A and C included in the image Im3 are displayed on the display unit, if a face is selected by the user, by displaying images including the selected face from among the images stored in the storage unit on the display unit, the user may immediately view or confirm the images. For example, in a state as illustrated in FIG. 4, if C is selected by the user, by displaying images including C on the display unit, the user may immediately view or confirm the images including C.

Figure 5A:
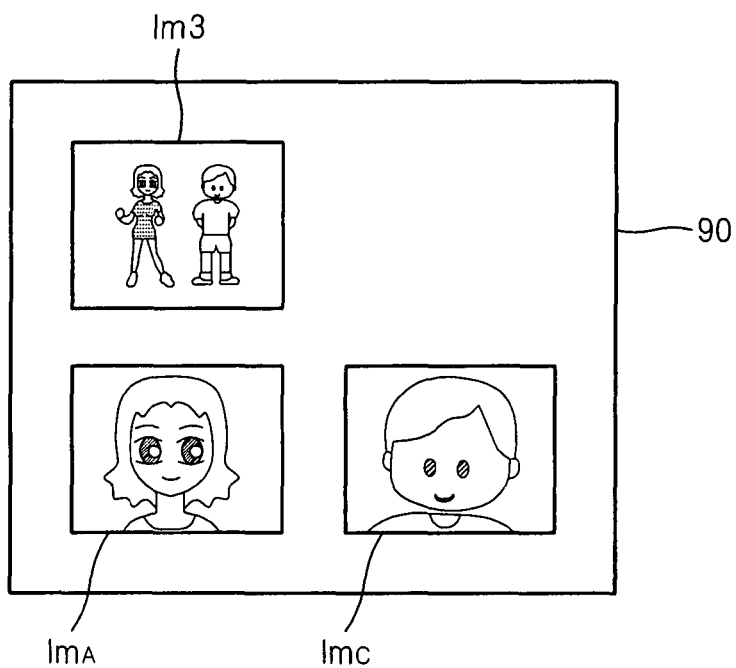
FIGS. 5A and 5B are conceptual diagrams for describing an operation of a digital image processing apparatus according to another embodiment of the present invention.
Figure 5B:
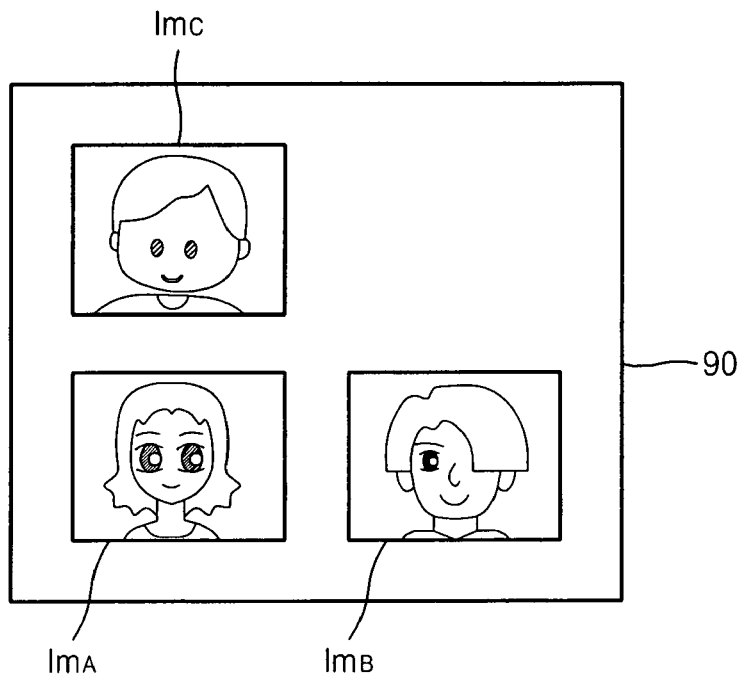

FIGS. 5A and 5B are conceptual diagrams for describing an operation of a digital image processing apparatus according to another embodiment of the present invention. The digital image processing apparatus according to the current embodiment can include a face recognition unit, a face index assignment unit, and a relation index update unit, which are the same as those in the digital image processing apparatus illustrated in FIG. 2.

When an image including a plurality of faces is displayed on a display unit, as shown in FIG. 5A, the digital image processing apparatus according to the current embodiment displays faces included in the image together. FIG. 5A shows that when the image Im3 including the two faces of A and C is displayed on the display unit, the two faces $Im_A$ and $Im_C$ of A and C are displayed on the display unit.

In this state, if a user selects one of the plurality of faces displayed, other faces having a relation index associated with the selected face are displayed on the display unit. For example, in a state in which 15 images having at least one of three faces of A, B, and C, as shown in Table 1, are stored in the storage medium, if the face of C is selected from FIG. 5A, since faces having a relation index associated with C correspond to A and B, two faces $Im_A$ and $Im_B$ of A and B are displayed on the display unit as shown in FIG. 5B. Then, the user can select a face from among faces included in an image and easily and immediately obtain information on faces captured and stored together with the selected face in the storage medium. In the alternative to that shown in FIG. 5B, only the two faces $Im_A$ and $Im_B$ of A and B having a relation index associated with C may be displayed on the display unit without displaying the face $Im_C$ of C on the display unit.

In the embodiment shown in FIG. 5A, if one of the plurality of faces is selected by the user, images including the selected face from among the images stored in the storage medium may be displayed on the display unit.

Referring to FIG. 4, when the image Im3 is displayed on the display unit, the faces $Im_A$ and $Im_C$ included in the image are displayed on the display unit, and in this case, the number of images including each of the faces $Im_A$ and $Im_C$ from among the images stored in the storage medium can be displayed with the faces $Im_A$ and $Im_C$. In this case, by displaying an icon having an arbitrary shape beside the number of images including each of the faces $Im_A$ and $Im_C$ from among the images stored in the storage medium, if this icon is clicked, other faces having a relation index associated with a face corresponding the clicked icon may be displayed on the display unit. If one of the faces $Im_A$ and $Im_C$ is clicked without an icon, images including the selected face from among the images stored in the storage medium may be displayed on the display unit. That is, various changes can be implemented.

Figure 5C:
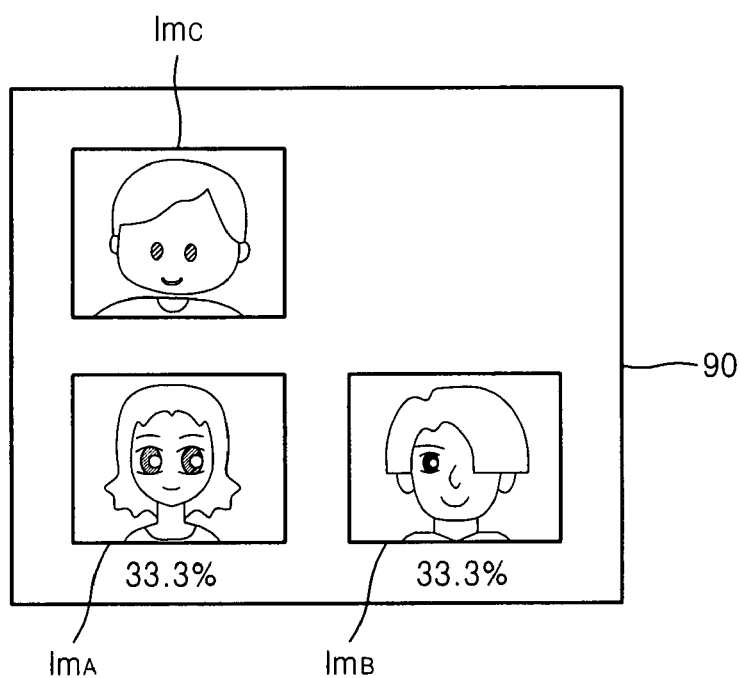
FIG. 5C is a conceptual diagram for describing an operation of a digital image processing apparatus according to another embodiment of the present invention.

FIG. 5C is a conceptual diagram for describing an operation of a digital image processing apparatus according to another embodiment of the present invention. The digital image processing apparatus according to the current embodiment includes a face recognition unit, a face index assignment unit, and a relation index update unit, which are the same as those in the digital image processing apparatus illustrated in FIG. 2. The digital image processing apparatus according to the current embodiment also includes an intimacy calculator calculating a grade of intimacy for each of a plurality of other faces with respect to a face. Thus, the digital image processing apparatus according to the current embodiment is different from the digital image processing apparatus described with reference to FIG. 5B, in that a grade of intimacy calculated by the intimacy calculator is displayed on the display unit with each face. For example, if the digital image processing apparatus according to the current embodiment is a digital capturing apparatus, the intimacy calculator may be a portion of the CPU 100 illustrated in FIG. 1. The intimacy calculator is an independent component not the portion of the CPU 100 illustrated in FIG. 1.

When an image including a plurality of faces is displayed on the display unit, the digital image processing apparatus according to the current embodiment displays the faces included in the image as shown in FIG. 5A. FIG. 5A shows that when the image Im3 including the two faces of A and C is displayed on the display unit, the two faces $Im_A$ and $Im_C$ of A and C included in the image Im3 are displayed on the display unit.

In this state, if a user selects one of the plurality of faces displayed, other faces having a relation index associated with the selected face are displayed on the display unit. Further, a grade of intimacy calculated by the intimacy calculator is displayed on the display unit with each face as illustrated in FIG. 5C. For example, in a state in which 15 images having at least one of three faces of A, B, and C, as shown in Table 1, are stored in the storage medium, if the face of C is selected from FIG. 5A, since faces having a relation index associated with C correspond to A and B, the two faces $Im_A$ and $Im_B$ of A and B are displayed on the display unit as shown in FIG. 5C. Then, 33.3%, which is a grade of intimacy for A with respect to the selected face of C, and 33.3%, which is a grade of intimacy for B with respect to the selected face of C, are displayed on the display unit. A grade of intimacy for another face with respect to a face, which is calculated by the intimacy calculator, calculated using Formula 1 where the number of images including any face, which are stored in the storage medium, is N and a relation index value of a face with respect to another face is $I_r$, $$(I_r/N) \times 100 \qquad \text{(Formula 1)}$$

Since a relation index of a face in relation to another face means the number of images in which the face and the other face are captured together, a grade of intimacy means a ratio of the number of images in which the face and the other face are captured together to the number of images stored in the storage medium. In a state in which 15 images having at least one of three faces of A, B, and C, as shown in Table 1, are stored in the storage medium as described above, relation indexes are determined as shown in Table 2, and in FIG. 5C, since the number of images in which A and C are captured together (a relation index of C on A) is 5 from among 15 that is the number of images stored in the storage medium, a grade of intimacy is calculated as 33.3%, and since the number of images in which B and C are captured together (a relation index of C on B) is 5 from among 15 that is the number of images stored in the storage medium, a grade of intimacy is calculated as 33.3%. Although the grade of intimacy is indicated by % in the current embodiment, various methods for indicating a ratio can be used. For example, the grade of intimacy for image B to C can be shown as "5/15." By using the grade of intimacy, the user can select one of a plurality of faces included in an image, and obtain information on faces captured and stored together with the selected face in the storage medium and easily and immediately obtain a grade of intimacy between the selected face and another face at the same time. In the alternative to that shown in FIG. 5C, only the two faces $Im_A$ and $Im_B$ of A and B having a relation index associated with C may be displayed with each grade of intimacy on the display unit without displaying the face $Im_C$ of C on the display unit.

While not shown, a digital image processing apparatus according to another embodiment of the present invention includes a face recognition unit, a face index assignment unit, and a relation index update unit, which are the same as those in the digital image processing apparatus illustrated in FIG. 2, and an intimacy calculator, which is the same as that in the digital image processing apparatus described with reference to FIG. 5C. The digital image processing apparatus according to the current embodiment further includes an image classifier. For example, the intimacy calculator may be a portion of the CPU 100 illustrated in FIG. 1. In another embodiment, the intimacy calculator may be an independent component, and not the portion of the CPU 100 illustrated in FIG. 1. In addition, the image classifier may be a portion of the CPU 100 illustrated in FIG. 1. In another embodiment, the image classifier may be an independent component, and not the portion of the CPU 100 illustrated in FIG. 1.

The image classifier classifies images stored in a storage medium according to a grade of intimacy regarding another face included in the images stored in the storage medium with respect to a specific face of a plurality of faces included in the images stored in the storage medium. The specific face can be selected using various methods; for example, the specific face may be selected by a user or selected automatically by the digital image processing apparatus. If the specific face is selected automatically by the digital image processing apparatus, the specific face may be a face having the greatest sum of relation index values with respect to faces included in the images stored in the storage medium or a face most frequently included in the images stored in the storage medium. Hereinafter, a case in which a face most frequently included in the images stored in the storage medium is selected is described for convenience of description.

For example, in a state in which 15 images having at least one of three faces of A, B, and C, as shown in Table 1, are stored in the storage medium, since A is captured and stored 13 times (Im1, Im2, Im3, Im5, Im6, Im7, Im8, Im9, Im10, Im11, Im13, Im14, Im15), B is captured and stored 12 times (Im1, Im2, Im4, Im5, Im6, Im7, Im8, Im9, Im10, Im11, Im14, Im15), and C is captured and stored 7 times (Im3, Im4, Im5, Im6, Im8, Im11, Im12), the images stored in the storage medium are classified according to a grade of intimacy for B or C based on A.

The image classifier classifies the images stored in the storage medium into a plurality of groups according to a grade of intimacy. In this case, the number of groups into which the images stored in the storage medium are classified and an intimacy area corresponding to each group can be set by the user. For example, if the images stored in the storage medium are classified into two groups, a group 1 and a group 2, having weights of 2:1, images including a face having a grade of intimacy equal to or greater than 66.6% (=2/(2+1)×100) based on the selected specific face A can belong to the group 1, and images including a face having a grade of intimacy less than 66.6% based on the selected specific face A can belong to the group 2. For example, in a state in which 15 images having at least one of three faces of A, B, and C, as shown in Table 1, are stored in the storage medium, since the grade of intimacy of A for B is 73.3% (11/15×100) and the grade of intimacy of A for C is 33.3% (5/15×100), images including A and images including B belong to the group 1, and images including only C without A or B belong to the group 2. That is, in a state in which 15 images captured by mixing three faces of A, B, and C, as shown in Table 1, are stored in the storage medium, the image Im12 including only C without A or B belong to the group 2, and the other images including A or B belong to the group 1. If necessary, images including A and images including B may belong to the group 1 and all images including C regardless of the existence of A or B may belong to the group 2. In this case, images belonging to the group 1 and the group 2 may exist.

In common, faces captured together have a high grade of intimacy, and they have a high possibility of belonging to the same group. Thus, the digital image processing apparatus according to the current embodiment provides an environment for easily and conveniently classifying images when the user wants to separately classify images including a face having a high grade of intimacy. Although a case in which images including three faces of A, B, and C are stored in a storage medium and classified into two groups, group 1 and group 2, has been described in the current embodiment, the present invention is not limited thereto. For example, when the images are classified into 4 groups having weights of 16:9:4:1, with respect to a specific face, images including a face having a grade of intimacy equal to or greater than 53.3% (=16/30×100) can belong to the group 1, images including a face having a grade of intimacy less than 53.3% and equal to or greater than 30.0% (=9/30×100) can belong to the group 2, images including a face having a grade of intimacy less than 30.0% and equal to or greater than 13.3% (=4/30×100) can belong to the group 3, and images including a face having a grade of intimacy less than 13.3% can belong to the group 4. The classification of images can be achieved, for example, by generating a folder corresponding to each group and assigning images of each group to a corresponding folder. A name of each group can be modified by the user, and a photograph belonging to a specific group can be moved to another group by the user. In addition, each image may include information on a group to which the image belongs. Besides, various changes can be implemented.

FIG. 6A is a flowchart illustrating a method of controlling a digital image processing apparatus, according to an embodiment of the present invention.

Referring to FIG. 6A, a face is recognized from an image in operation S100. A face index including personal information, such as a name, is assigned to the recognized face in operation S200. A relation index for the face included in the image is updated in operation S300. Updating a relation index can be achieved as described in the embodiments with reference to FIGS. 1 and 2.

The method of controlling a digital image processing apparatus according to the current embodiment can provide an environment for processing relational data between faces according to various user demands in the future by recognizing a face included in an image, assigning a face index to the recognized face, and updating relation indexes between faces for faces included in images stored in a storage medium.

FIG. 6B is a flowchart illustrating a method of controlling a digital image processing apparatus, according to another embodiment of the present invention. The method according to the current embodiment is different from the method illustrated in FIG. 6A in that the method according to the current embodiment further includes determining whether a recognized face is a previously recognized face (S210) and determining whether the number of faces included in an image is one (S320).

It is determined in operation S210 whether the recognized face is a previously recognized face. If it is determined in operation S210 that the recognized face is a newly recognized face and not a previously recognized face, a face index including personal information, such as a name, is assigned to the recognized face in operation S220, and this process proceeds to the determining whether the number of faces included in an image is one (S320). If it is determined in operation S210 that the recognized face is a previously recognized face, a face index is not newly assigned, and this process proceeds to the determining whether the number of faces included in an image is one (S320). If a plurality of faces are recognized since the plurality of faces are included in the image, it is determined for each face in operation S210 whether the recognized face is a previously recognized face, and if it is determined in operation S210 that the recognized face is a newly recognized face and not a previously recognized face, a face index including personal information, such as a name, is assigned to each of the recognized faces in operation S220.

Figure 6C:
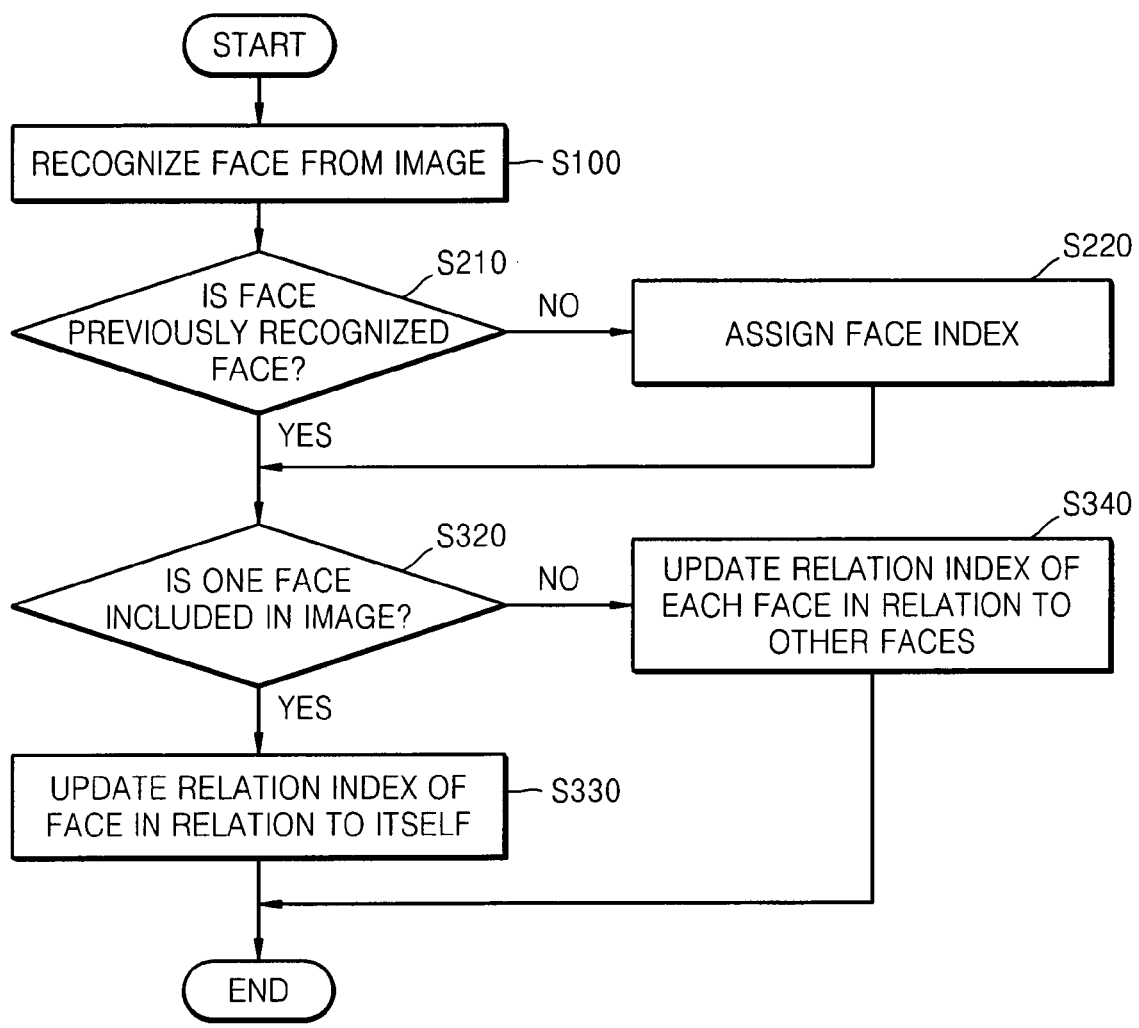
FIG. 6C is a flowchart illustrating a method of controlling a digital image processing apparatus, according to another embodiment of the present invention.

It is determined in operation S320 whether the number of faces included in the image is one, and if it is determined in operation S320 that a plurality of faces are included in the image, a relation index of each face included in the image on each of the other faces included in the image is updated in operation S340. If only one face is included in the image, the process ends without updating a relation index (i.e., stores the image in a storage medium). Referring to the flowchart of FIG. 6C, illustrating a method of controlling a digital image processing apparatus, according to another embodiment of the present invention, it is determined in operation S320 whether the number of faces included in the image is one, and if it is determined in operation S320 that only one face is included in the image, a relation index of the face on itself may be updated in operation S330.

As described above, the method of controlling a digital image processing apparatus according to the current embodiment can provide an environment for processing relational data between faces according to various user demands in the future by recognizing a face included in an image and updating relation indexes between faces for faces included in images stored in the storage medium.

Figure 7A:
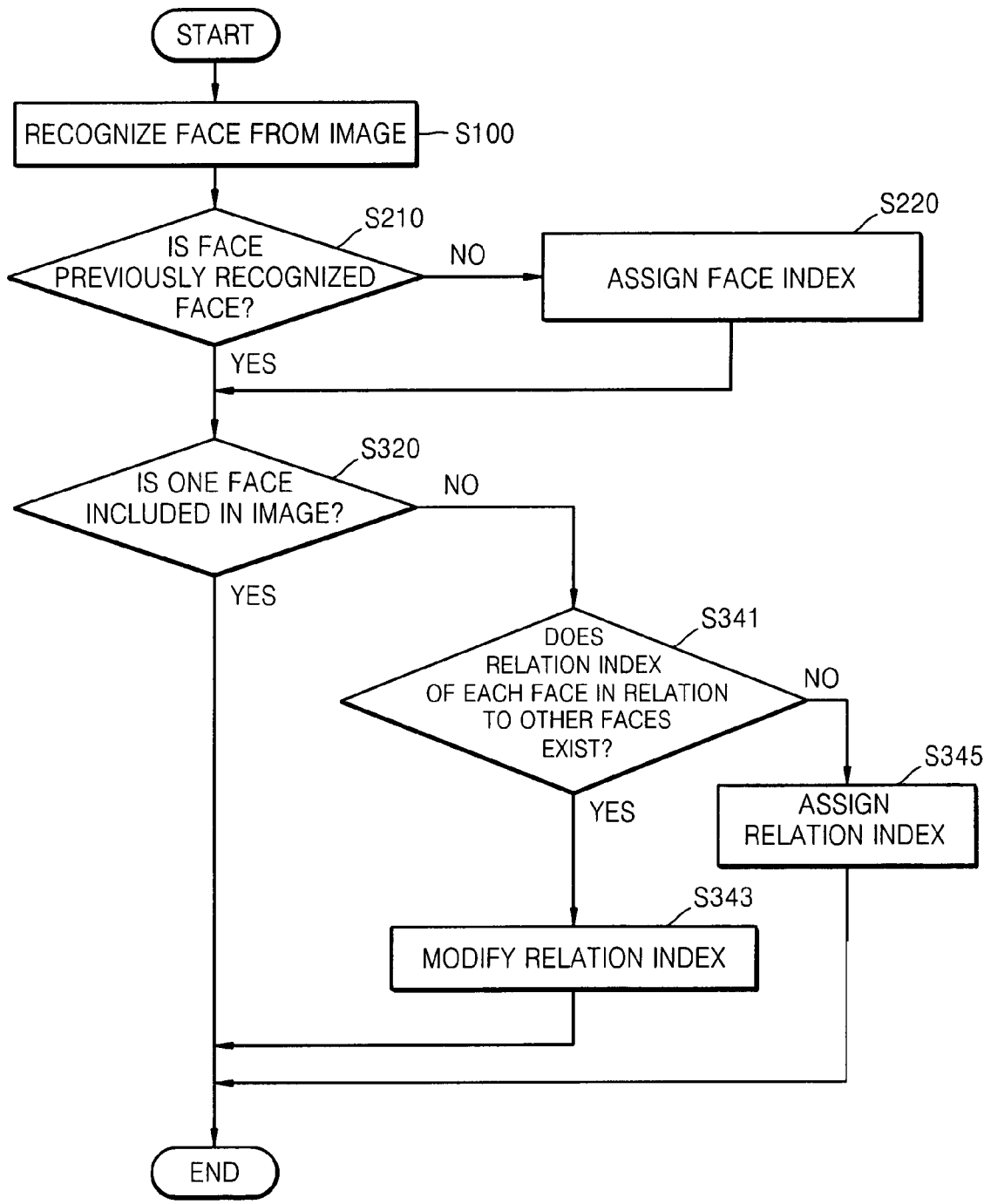
FIG. 7A is a flowchart illustrating a method of controlling a digital image processing apparatus, according to another embodiment of the present invention.

FIG. 7A is a flowchart illustrating a method of controlling a digital image processing apparatus, according to another embodiment of the present invention. Referring to FIG. 7A, a face is recognized from an image including the face in operation S100. It is determined in operation S210 whether the recognized face is a previously recognized face. If it is determined in operation S210 that the recognized face is a newly recognized face and not a previously recognized face, a face index including personal information, such as a name, is assigned to the recognized face in operation S220, and this process proceeds to the determining whether the number of faces included in an image is one (S320). If it is determined in operation S210 that the recognized face is a previously recognized face, a face index is not newly assigned, and this process proceeds to the determining whether the number of faces included in an image is one (S320).

It is determined in operation S320 whether the number of faces included in the image is one, and if it is determined in operation S320 that only one face is included in the image, the process ends without updating a relation index. If it is determined in operation S320 that a plurality of faces are included in the image, it is determined in operation S341 whether a relation index in relation to another face with respect to each of the faces exists. If it is determined in operation S341 that a relation index in relation to another face with respect to a face does not exist, a relation index is assigned to the face in operation S345. If it is determined in operation S341 that a relation index in relation to another face with respect to a face exists, the relation index is modified in operation S343. The modifying of the relation index may include increasing the relation index. In detail, the assigning of the relation index may include assigning a relation index having a value of 1, and the modifying of the relation index may include increasing the relation index by 1. In an alternative embodiment, a different relation index may be assigned, and/or the relation index may be modified using a different method. In the current embodiment and the embodiment described below, for convenience of description, the assigning of the relation index comprises assigning a relation index having a value of 1, and the modifying of the relation index comprises increasing the relation index by 1.

The method of controlling a digital image processing apparatus according to the current embodiment can provide an environment for processing relational data between faces according to various user demands in the future by recognizing a face included in an image and updating relation indexes between faces for faces included in images stored in a storage medium.

Figure 7B:
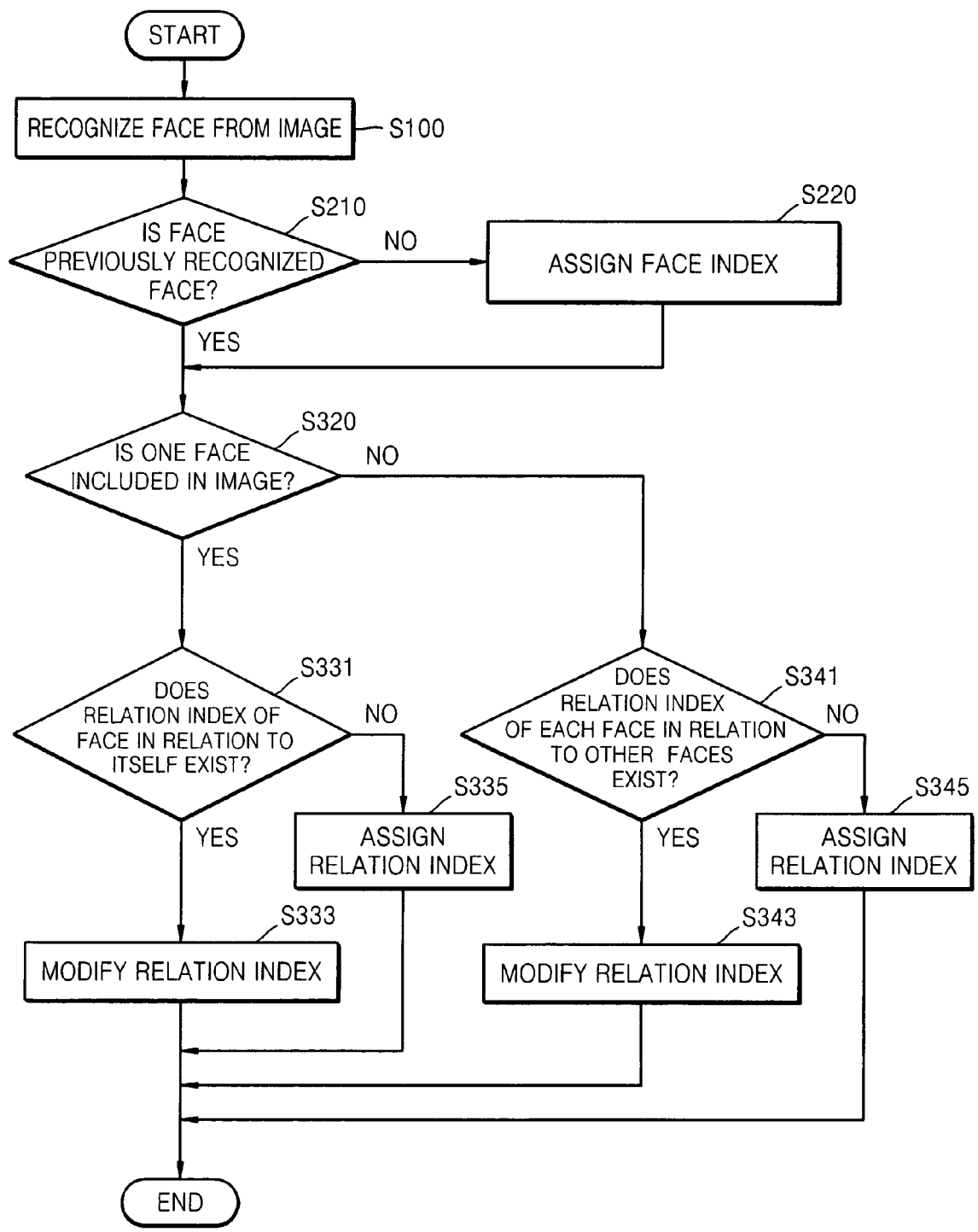
FIG. 7B is a flowchart illustrating a method of controlling a digital image processing apparatus, according to another embodiment of the present invention.

FIG. 7B is a flowchart illustrating a method of controlling a digital image processing apparatus, according to another embodiment of the present invention. The method according to the current embodiment is different from the method illustrated in FIG. 7A in that a case in which only one face is included in an image is processed. In the method according to the current embodiment, it is determined in operation S320 whether only one face is included in an image. If it is determined in operation S320 that only one face is included in the image, it is determined in operation S331 whether a relation index of the face in relation to itself exists. If it is determined in operation S331 that a relation index of the face in relation to itself does not exist, a relation index is assigned to the face in operation S335. If it is determined in operation S331 that a relation index of the face in relation to itself exists, the relation index is modified in operation S333.

The method of controlling a digital image processing apparatus according to the current embodiment can provide an environment for processing relational data between faces according to various user demands in the future by recognizing a face included in an image and updating relation indexes between faces for faces included in images stored in a storage medium.

By using the environment provided by the various methods of controlling a digital image processing apparatus, the following various methods of controlling a digital image processing apparatus can be implemented for the convenience of a user.

For example, if a user selects one of a plurality of faces included in images stored in a storage medium, by displaying images including the selected face from among the images stored in the storage medium on a display unit, the user can easily and immediately obtain the images including the selected face. In addition, when an image is displayed on the display unit, by displaying a face included in the image on the display unit with the number of images including the face from among the images stored in the storage medium, the user can immediately obtain the number of relevant images. Different to the previous method, when an image is displayed on the display unit, faces included in the image are displayed on the display unit, and if the user selects one of the displayed faces, images including the selected face from among the images stored in the storage medium can be displayed on the display unit.

In addition, when an image is displayed on the display unit, faces included in the image are displayed on the display unit, and if the user selects one of the displayed faces, other faces having a relation index associated with the selected face can be displayed on the display unit. In this case, a grade of intimacy using the relation index, as described in the above embodiments, may be displayed with each of the other faces.

In addition, according to a method of controlling a digital image processing apparatus according to another embodiment of the present invention, a controlling method of classifying the images stored in the storage medium according to the grade of intimacy as described above can be implemented.

The invention can also be embodied as computer readable codes on a computer readable recording medium. The computer readable recording medium is any data storage device that can store data which can be thereafter read by a computer system, e.g. the storage medium 80 or the memory 60 in the case of the digital capturing apparatus illustrated in FIG. 1. Examples of the computer readable recording medium include read-only memory (ROM), random-access memory (RAM), CD-ROMs, magnetic tapes, floppy disks, optical data storage devices, and carrier waves (such as data transmission through the Internet).

In an embodiment, the methods disclosed herein are implemented as part of a photo management program on a computer and a user can easily locate photographs containing a specific person or group of people that are stored on the computer or in a specific location on the computer using the program.

As described above, according to the present invention, by providing an environment allowing a user to easily obtain information regarding a relevant face, user convenience can be significantly enhanced.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A digital image processing apparatus comprising:
   a face recognition unit recognizing a first face in an image;
   a face index assignment unit assigning a face index to the first face if the first face is not a previously recognized face; and
   a relation index update unit that, if the image includes a second face, updates a relation index corresponding to the number of times the first face and second face appear together in a plurality of images, the relation index update unit comprising:
      a relation index assignment unit assigning the relation index to the first face if the first face does not have a relation index corresponding to the number of times the first face and the second face appear together in the plurality of images; and
      a relation index modifier modifying the relation index if the first face has a relation index corresponding to the number of times the first face and the second face appear together in the plurality of images.

2. The digital image processing apparatus of claim 1, wherein the face index comprises personal information.

3. The digital image processing apparatus of claim 1, wherein the relation index assignment unit assigns a value of 1 to the relation index, and the relation index modifier increases the value of the relation index by 1.

4. A method of controlling a digital image processing apparatus, which includes a processor, comprising:
   (a) recognizing a first face in an image;
   (b) if the first face is not a previously recognized face, assigning a face index to the first face; and
   (c) if the image includes a second face, updating a relation index corresponding to the number of times the first face and the second face appear together in a plurality of images, by the steps of:
      (c1) if the first face does not have a relation index corresponding to the number of times the first face and the second face appear together in the plurality of images, assigning the relation index to the first face; and
      (c2) if the image has a relation index corresponding to the number of times the first face and the second face appear together in the plurality of images, modifying the relation index.

5. The method of claim 4, wherein the face index comprises personal information.

6. The method of claim 4, further comprising:
   (d) if one of the first and second faces is selected, displaying images including the selected face from among the plurality of images.

7. The method of claim 6, wherein a face can be selected by a user.

8. The method of claim 4, wherein the modifying of the relation index comprises increasing the value of the relation index.

9. The method of claim 4, wherein (c1) comprises assigning a value of 1 to the relation index, and (c2) comprises increasing the value of the relation index by 1.

10. The method of claim 4, further comprising:
    (e) displaying the image, the first face, and the number of times the first face appears in the plurality of images.

11. The method of claim 4, further comprising:
    (f) displaying the first and second faces and, if one of the first and second faces is selected, displaying images including the selected face from among the plurality of images.

12. The method of claim 4, further comprising:
    (g) if one of the first and second faces is selected, displaying other faces having a relation index associated with the selected face.

13. The method of claim 12, wherein a grade of intimacy is displayed with each of the other faces having a relation index associated with the selected face.

14. The method of claim 13, wherein the grade of intimacy is calculated using the formula $(I_r/N) \times 100$, where $I_r$ is a relation index value of the selected face with respect to each of the other faces and N is the number of images among the plurality of images having at least one face.

15. The method of claim 4, further comprising:
    (h) classifying the images stored in the storage unit based on a grade of intimacy calculated using the formula $(I_r/N) \times 100$, where $I_r$ is a relation index value of a specific face with respect to other faces and N is the number of images among the plurality of images having at least one face.

16. The method of claim 15, wherein the specific face is the face included in the most images with respect to all faces included in the plurality of images.

17. The method of claim 4, wherein at least some of the plurality of images stored in the storage medium are classified into groups based on grade of intimacy values set by a user.

18. A non-transitory computer readable recording medium having a computer readable program comprising:
    procedure for recognizing data corresponding to a face in an image file;
    procedure for assigning a face index to the face; and
    procedure for updating a relationship index to correspond to the number of image files having data corresponding to the face, the relationship index updating procedure comprising:
       a procedure for assigning the relation index to the first face if the first face does not have a relation index corresponding to the number of times the first face and the second face appear together in the plurality of images; and a procedure for modifying the relation index if the first face has a relation index corresponding to the number of times the first face and the second face appear together in the plurality of images.

* * * * *